June 9, 1936.  A. J. KUTCHERA  2,043,969

PROCESSING APPARATUS

Filed Feb. 11, 1933  2 Sheets-Sheet 1

WITNESS:
Rob R Kitchel.

INVENTOR
Alfred J. Kutchera
BY
Busser & Harding
ATTORNEYS.

June 9, 1936.  A. J. KUTCHERA  2,043,969
PROCESSING APPARATUS
Filed Feb. 11, 1933  2 Sheets-Sheet 2
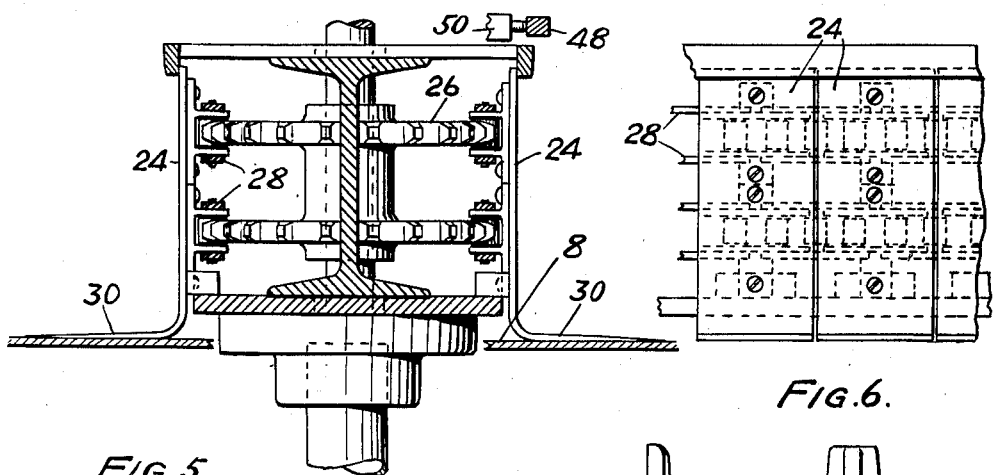
FIG.5.
FIG.6.
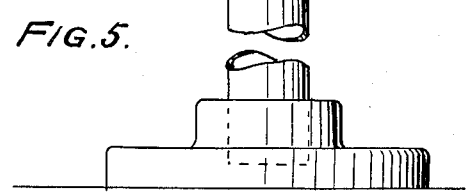
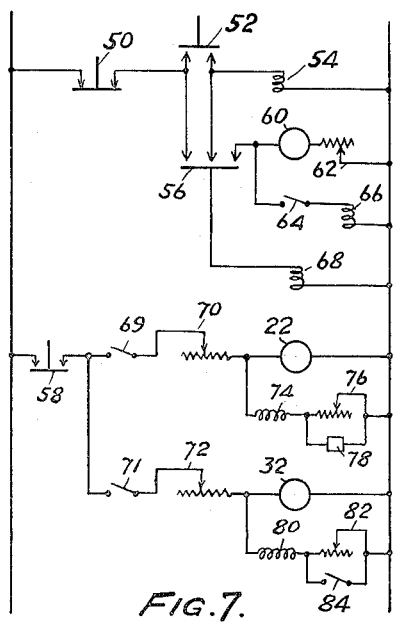
FIG.7.
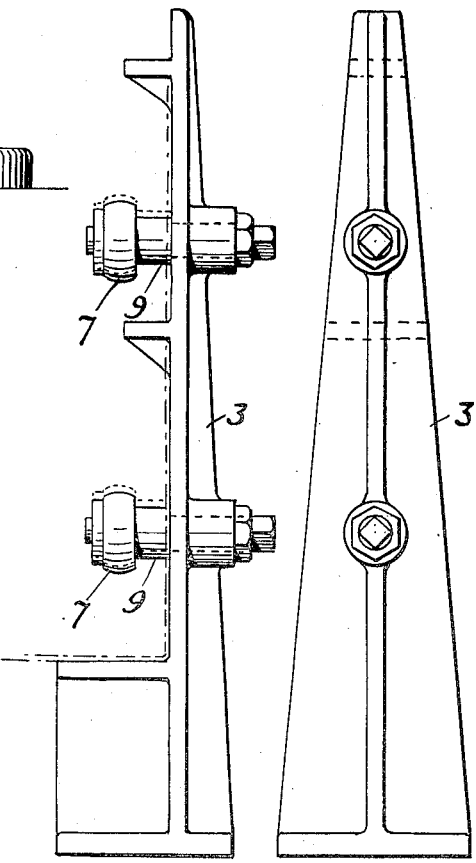
FIG.3.  FIG.4.
WITNESS:
Robt R Kitchel
INVENTOR
Alfred J. Kutchera
BY Busser & Harding
ATTORNEYS Patented June 9, 1936

2,043,969

UNITED STATES PATENT OFFICE 2,043,969

PROCESSING APPARATUS

Alfred J. Kutchera, Philadelphia, Pa.

Application February 11, 1933, Serial No. 656,247

6 Claims. (Cl. 198—103)

This invention relates to a pasteurizing apparatus and more particularly to an apparatus having the general characteristics of that illustrated in the patent to Slama, 1,867,771, dated July 19, 1932. Pasteurizing apparatus of the general character illustrated in the above patent is used for the pasteurization of beer, near-beer or similar malt beverages or other liquids such as milk, or the like. In this type of apparatus a revolving table of annular shape is provided which heretofore has been continuously rotated. The bottles are delivered to this table by a suitable conveyor and are discharged therefrom by another conveyor generally of duplex form as indicated in the Slama patent. During the passage of the bottles through the apparatus on the table they are subjected to varying degrees of temperature, the heat being applied by producing a rain of hot water over the bottles during their passage. In general, a number of different portions of the apparatus are provided in which the treating water has varying temperatures so that the filled bottles are subjected to a gradually increasing temperature and are finally cooled prior to emerging from the machine.

Pasteurizing apparatus of this character has heretofore been unsatisfactory by reason of the fact that jamming of the bottles at the discharge very readily occurs with consequent liability of breakage or falling of the bottles to a horizontal position which will increase the likelihood of the damage. Attempts to avoid breakage have heretofore been made by providing two or more discharge belts running in parallelism at different rates of speed. The first belt, arranged to receive the bottles from the rotating table, after they pass upwardly over a suitable incline, travels at a relatively slow rate so as to avoid changing the direction of motion of the bottles so rapidly that they might be caused to overturn. The bottles are then transferred to a second conveyor belt traveling at a higher speed which either discharges them or transfers them to a still more rapidly moving conveyor. The belts heretofore used take the form of chain conveyors passing over sprocket wheels having horizontal axes. The table must of course pass between the two laps of the belt. This necessitates the provision of the inclination mentioned above, which is necessarily substantial to lead the bottles from the surface of the table upwardly to a level where they will pass upon the belt. The inclination is necessarily of substantial amount inasmuch as the elevation is fairly considerable. As a result a large number of bottles are being pushed by others upwardly over the incline with a consequent large amount of friction and likelihood of production of jamming which will result in breakage.

It is the primary object of the present invention to provide a pasteurizing apparatus of this character in which the transporting and transferring of the containers, such as bottles, to the table and the transfer of the bottles to the conveyor and transporting of the bottles from the table may be effected without breakage and without jamming. Specifically this is accomplished by the use of a single conveyor, which does not require the presence of a fixed incline and which is operated in proper relationship to the rotating table to cause the bottles to be transported and transferred to the table by a stretch of the conveyor moving radially inward across the table and transferred to and transported from the table by a stretch of the conveyor moving radially outward across the table and effecting the transferring and transporting of the bottles to and from the table with a minimum likelihood of jamming. In the specific form of the invention shown the table is preferably moved intermittently while the conveyor has an intermittent change of speed of movement, being advanced at a low speed while the table is revolving to provide a clear space on the table to receive bottles and at a higher speed while the table is stationary to transfer bottles to said clear space of the table, the bottles being transferred to the conveyor during the slow movement thereof and the rotation of the table and transported from the table during the period of high speed of the conveyor and the period of rest of the table.

Specific objects of the invention will be apparent from the following description read in conjunction with the accompanying drawings in which:

Figs. 3 and 4 are side and front elevations respectively of an upright member for supporting the rotating table;

Fig. 5 is a sectional view showing the conveyor and the method of mounting the same;

Fig. 6 is a side elevation of a portion of the same; and

Fig. 7 is a wiring diagram showing a preferred means for securing the proper feeding relationships for the table and conveyor.

Figure 2:
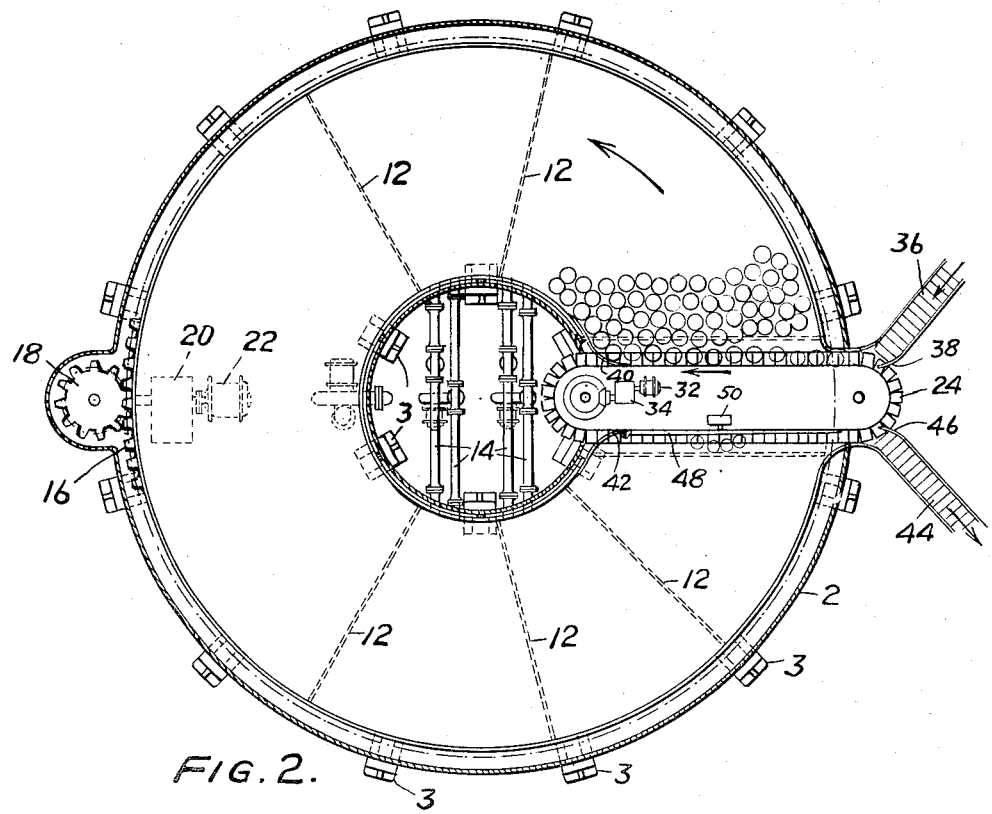
Fig. 2 is a horizontal sectional view of the same.
Figure 1:
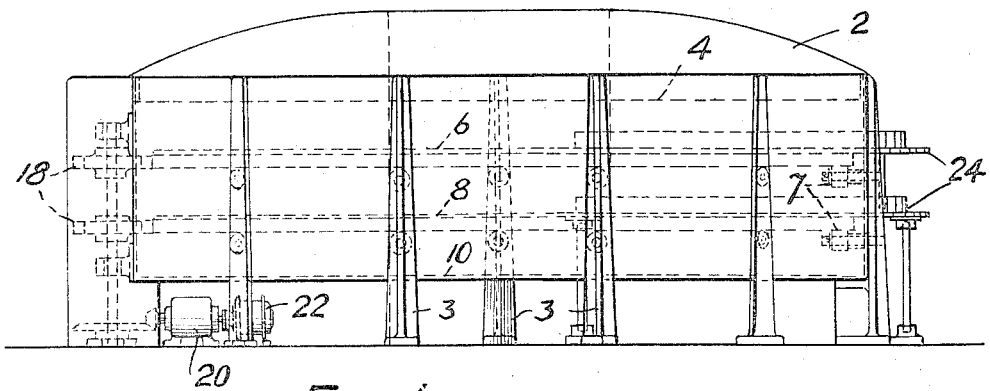
Fig. 1 is a front elevation of one form of the improved apparatus.

A casing 2 of suitable form is provided to enclose the moving tables of which two are illustrated in the present apparatus. At the top of the apparatus is an annular chamber having a perforated bottom 4 of the usual type, this chamber being separated into compartments so that water at different temperatures from the various compartments may rain down upon bottles carried by the rotating annular tables 6 and 8, the upper of which is desirably perforated so that the water will rain therethrough upon bottles carried by the lower one. Alternatively a second perforated chamber may be provided between the two rotating tables so that water may be pumped thereinto at proper temperatures and caused to rain down upon the lower series of bottles. Receiving chambers 10 separated by partition walls 12 are provided to correspond with the various sections of the upper perforated chambers so as to receive the liquid after it flows over the bottles. A heating of the liquid in these chambers is effected by the use of steam the inlet of which is thermostatically controlled so that the liquid in each chamber is maintained at an appropriate temperature. A pumping system indicated at 14 is provided to pump the liquid from each receiving chamber into the corresponding upper chamber. The arrangement of the chambers is preferably such that, for example, the bottles as they pass into the apparatus are first subjected to a temperature of, say, 90°, then 110°, and finally a pasteurizing temperature of 150°. Following this they are successively cooled to 110° and 90° and may then be further cooled by the application of unheated water from a municipal supply.

The two annular tables 6 and 8 are similar in construction being supported upon rollers 7 which are carried by studs 9 eccentrically mounted in the upright standards 3 which serve to support the outer housing. By rotary adjustment of the studs the rollers 7 may be raised or lowered as desired to level the tables.

Each of the tables is provided with a large annular gear meshing with a corresponding pinion 18, the pinions being in the present instance mounted on a common shaft driven through suitable reduction gearing 20 by a motor 22. It will of course be understood that the invention is applicable to a single table arrangement in which case there will be no duplication of parts as indicated in the instant disclosure.

A single conveyor of the chain type is used in the present instance for both charging and discharging each table of the apparatus. As shown most clearly in Figs. 5 and 6, each conveyor 24 includes a pair of chains comprising links 28 pivoted to each other in conventional fashion. These pivotal connections are engaged by spaced supporting sprocket wheels 26 rotating about vertical axes at the two ends of the conveyor, whereby the conveyor is arranged with one stretch to move radially inward across the table and the other stretch of the conveyor to move radially outward across the table. In the present instance, the outer of these sprockets is an idler, the innermost one being driven through suitable reduction gearing 34 by a motor 32. The links of the chains carry container supports of the type indicated at 30 which extend and taper outwardly in the direction of travel of the table from a conveyor chain, in the present instance the lower chain, and preferably positioned closely adjacent to or engaging the table so as to slide thereover. By reason of their tapered construction the bottles may be readily moved both onto and off from the supports without danger of overturning. A suitable chain conveyor indicated at 36 and associated with a deflector 38 is arranged to feed bottles to the conveyor 24. The bottles are transferred from the supports of the stretch of the conveyor 24 moving radially inward across the table onto the table by a deflector indicated at 40 which is secured to a central semi-cylindrical wall as indicated in Fig. 2 so as to space the bottles from this wall initially thus aiding in maintaining them spaced therefrom during the rotary movement with the table. A deflector indicated at 42 serves to guide and transfer the innermost bottles from the table onto the supports of the stretch of the conveyor moving radially outward across the table by which they are transported from the table onto a conveyor 44 associated with a deflector 46. As indicated in Figs. 2 and 5 a pivoted bar 48 is located so as to be engaged by bottles moved upon the supporting members 30 at the discharge position. Normally this bar will not be moved by the bottles. However, if excessive pressure occurs due to jamming the bar will be deflected inwardly and will open a switch 50 causing stopping of the machine.

In order to insure proper handling of the bottles it is desirable to give the annular table an intermittent rotary movement and to also vary the speed of the chain conveyor so as to clear the bottles rapidly from discharging position when the annular table is stationary. To effect these results there may be used the electrical connections illustrated in Fig. 7. In this figure the stop switch 50 arranged to be operated by the bar 48 is indicated in the starting line in series with the starting switch 52. Also located in this line is a solenoid indicated at 54 which when energized by the simultaneous closure of both switches 50 and 52 serves to close the switches 56 and 58. Closure of the switch 56 energizes the motor 60 which operates as a timing motor to intermittently open and close the switches 64 and 84. A rheostat 62 in series with the motor 60 which is quite small serves to control its speed of operation and consequently the lengths of the periods of the cycle.

In series with the switch 64 is a solenoid 66 which when energized closes a switch 69 of a starter 70 which is conventionally illustrated in the figure. This starts in the usual manner the motor 22 which drives the table or tables carrying the bottles. A solenoid 68 correspondingly closes the switch 71 and sets into operation the automatic starter 72 in series with the conveyor motor 32.

There is provided in series with the field 74 of the motor 22 a field rheostat 76 which is manually adjustable to regulate the speed of motor 22. Shunted across the field rheostat is a vibrating relay of conventional type indicated at 78.

The shunt field 80 of the motor 32 has provided in series with it a field rheostat 82 shunted by the switch 84 controlled by the timing motor 60. When the field rheostat 82 is short-circuited by the closure of switch 84 the motor 32 will operate to drive the conveyor at a low speed. On the other hand, when the field current is cut down by the opening of switch 84 the speed of the motor increases so that the belt is driven at a higher speed.

The connections between the motor 60 and the switches 64 and 84 are such that when the switch 64 is closed, that is, when the motor 22 is operating and the table is rotating, the switch 84 will be closed so that the conveyor 24 will be operating at a low rate of speed. On the other hand, when the switch 64 is open so that the table is stationary the switch 84 will be open so that the conveyor will be operating at a high rate of speed.

In the operation of the mechanism the bottles may be continuously fed by the conveyors 36 and 24 onto the corresponding rotating table with the result that they will fill up the complete radial extent thereof to a substantial degree. In accordance with the preceding description of the electrical connections the conveyor 24 is continuously operating although at varying speeds.

As the bottles reach the discharge position they are moved upon the conveyor 24 intermittently in groups. The movements of the annular table are such that in each step a movement of the table takes place which midway of its width is of an extent approximately equal to the diameter of a bottle. Accordingly, after each movement of the table there will in ordinary operation be one or more bottles located on the conveyor 24. When the table stops the conveyor speeds up and clears these bottles away from the table discharging them on the conveyor at 44. It will be noted that after the bottles are moved on the conveyor it can be more safely driven at a higher rate of speed while minimizing the possibility of overturning of any of the bottles. Accordingly for best efficiency the operation just indicated is provided. It will be obvious, however, that the conveyor may move continuously at a fixed rate of speed rather than at a variable rate depending upon the characteristics of operation desired and particularly the shapes of bottles which will determine whether or not they may readily upset during the discharging operation.

Instead of the electrical control described above the control may at least in part be mechanical in character. For example, instead of the ordinary pinions 18 mutilated pinions may be provided which will impart during their continuous rotation an intermittent rotation to the annular table or tables.

It will be obvious that numerous details of the invention may be changed without departing from the spirit thereof as defined in the following claims.

What I claim and desire to protect by Letters Patent is:

1. In combination, a movable table for progressing containers, a conveyor moving across the table transversely to the path of movement thereof arranged to receive containers from the table, means for intermittently moving the table, and means for moving the conveyor continuously at periodically varying speeds.

2. In combination, a movable table for progressing containers, a conveyor moving across the table transversely to the path of movement thereof arranged to receive containers from the table, means for intermittently moving the table, and means for moving the conveyor continuously at periodically varying speeds, said conveyor moving more rapidly when the table is stationary than when it is moving.

3. A conveying means for a pasteurizer or the like, comprising a movable table for progressing containers, a conveyor moving across the table transversely of the path of movement thereof arranged to receive containers from the table, said conveyor including a continuous chain moving about vertical axes, and container supporting members carried by the chain and extending closely adjacent to and in the direction of the surface of the table to receive and transport containers from the table.

4. In a conveying means for a pasteurizer or the like, a movable container transporting table, and a conveyor moving across the table transversely of the path of movement thereof carrying container supports positioned closely adjacent to the surface of the table and extending in the direction of travel of the table adapted to transport and transfer containers to the table and receive and transport containers from the table.

5. In conveying means for a pasteurizer or the like, a rotatable container transporting table, and a conveyor movable transversely across the table carrying container supports positioned closely adjacent the surface of the table and extending in the direction of travel of the table adapted to transport and transfer containers to the table and receive and transport containers from the table.

6. In conveying means for a pasteurizer or the like, a rotatable container transporting table, and an endless conveyor arranged with one stretch to move radially inward across the table and the other stretch radially outward across the table and carrying container supports to extend in the direction of travel of the table and contiguous to the surface of the table, said stretch of the conveyor travelling radially inward of the table adapted to transport and transfer containers to the table and said stretch of the conveyor moving radially outward of the table adapted to receive and transport containers from the table.

ALFRED J. KUTCHERA.